United States Patent
Ergun et al.

(10) Patent No.: US 8,660,766 B2
(45) Date of Patent: Feb. 25, 2014

(54) METHOD FOR COMPUTATIONAL DETERMINATION OF THE OIL TEMPERATURE IN A CLUTCH UNIT

(75) Inventors: Ender Ergun, St. Marein (AT); Manfred Gollner, Hellgenkreuz am Waasen (AT); Martin Parigger, Eggersdorf (AT)

(73) Assignee: Magna Powertrain AG & Co KG, Lannach (AT)

( * ) Notice: Subject to any disclaimer, the term of this patent is extended or adjusted under 35 U.S.C. 154(b) by 596 days.

(21) Appl. No.: 12/995,810

(22) PCT Filed: May 26, 2009

(86) PCT No.: PCT/EP2009/003729
§ 371 (c)(1),
(2), (4) Date: Apr. 21, 2011

(87) PCT Pub. No.: WO2009/146816
PCT Pub. Date: Dec. 10, 2009

(65) Prior Publication Data
US 2012/0024653 A1  Feb. 2, 2012

(30) Foreign Application Priority Data
Jun. 3, 2008  (DE) .......................... 10 2008 026 553

(51) Int. Cl.
*F16D 28/00* (2006.01)
*G06F 15/00* (2006.01)
*F16D 43/25* (2006.01)

(52) U.S. Cl.
USPC ............... 701/68; 701/67; 477/70; 477/76; 477/97; 477/98; 192/58.63; 192/58.62; 192/82 T; 374/100; 374/10; 374/112; 702/130

(58) Field of Classification Search
USPC ............... 701/67, 68; 477/70, 76, 97, 98; 192/58.63, 58.62, 58.2, 82 T; 310/16; 374/100, 10, 112; 702/130
See application file for complete search history.

(56) References Cited

U.S. PATENT DOCUMENTS

| | | | | |
|---|---|---|---|---|
| 5,216,606 A | * | 6/1993 | Lentz et al. | 701/66 |
| 5,839,084 A | * | 11/1998 | Takasaki et al. | 701/67 |
| 6,834,225 B1 | * | 12/2004 | Jiang et al. | 701/67 |

(Continued)

FOREIGN PATENT DOCUMENTS

| | | |
|---|---|---|
| DE | 102007044452 A1 | 4/2008 |
| GB | 2149923 A | 6/1985 |

(Continued)

*Primary Examiner* — Thomas Black
*Assistant Examiner* — Sara Lewandroski
(74) *Attorney, Agent, or Firm* — Dickinson Wright PLLC

(57) ABSTRACT

A clutch unit (47) comprises a wet friction clutch for controllable transmission of a torque from an input element (41) to an output element (45), housing that contains the friction clutch and oil for cooling the friction clutch, and an actuator (51) for actuating the friction clutch. The actuator is attached to the housing in a thermally conductive way and has a temperature sensor (108) for sensing a temperature of the actuator. In order to computationally determine the oil temperature ($T_{Öl}$) in the clutch unit (47), a thermal input power to the clutch unit is determined as a function of at least a speed of the input element and/or of the output element. The difference between the thermal input power and the thermal output power is determined, and the oil temperature is determined as a function of the difference that was determined.

19 Claims, 5 Drawing Sheets

(56) References Cited

U.S. PATENT DOCUMENTS

| | | | |
|---|---|---|---|
| 7,032,733 B2 * | 4/2006 | Parigger | 192/84.6 |
| 7,111,716 B2 * | 9/2006 | Ekonen et al. | 192/20 |
| 2006/0052216 A1 * | 3/2006 | Ueura et al. | 477/97 |
| 2008/0161155 A1 * | 7/2008 | Suzuki et al. | 477/98 |

FOREIGN PATENT DOCUMENTS

| | | | |
|---|---|---|---|
| JP | 11287257 A | 10/1999 | |
| WO | 03/025422 A1 | 3/2003 | |
| WO | 2005/057039 A1 | 6/2005 | |
| WO | WO 2006059031 A1 * | 6/2006 | F16D 25/12 |

* cited by examiner

METHOD FOR COMPUTATIONAL DETERMINATION OF THE OIL TEMPERATURE IN A CLUTCH UNIT

CROSS-REFERENCE TO RELATED APPLICATIONS

This application is a National Stage of International Application No. PCT/EP2009/003729, filed May 26, 2009. This application claims the benefit and priority of German Application No. 10 2008 026 553.5, filed Jun. 3, 2008. The entire disclosures of each of the above applications are incorporated herein by reference.

FIELD

The present disclosure concerns a method for computational determination of the oil temperature in a clutch unit for a drive train of a motor vehicle, wherein the clutch unit contains, at a minimum, a wet friction clutch for controllable transmission of a torque from an input element to an output element of the clutch unit, a housing that contains the friction clutch and oil for cooling the friction clutch, and an actuator for actuating the friction clutch that is attached to the housing in a thermally conductive way and has a temperature sensor for sensing a temperature of the actuator. The present disclosure also concerns a torque transmission arrangement that has an input element, an output element, a control unit, and a clutch unit of the aforementioned type.

BACKGROUND

This section provides background information related to the present disclosure which is not necessarily prior art.

A clutch unit may be used, for example, in a transfer case of a motor vehicle with four-wheel drive for controllable transmission of a drive torque to a primary axle and/or a secondary axle of the motor vehicle. In the case of a so-called "torque on demand" transfer case, the wheels of the primary axle are continuously driven while a portion of the drive torque can be selectively transmitted to the wheels of the secondary axle by means of the clutch unit. The transfer case can also be designed as a controllable center differential in which the clutch unit is associated with a differential lock in order to adjust the distribution of the drive torque in the longitudinal direction of the vehicle. A clutch unit can also be used in a torque transmission arrangement, which, in a motor vehicle with a continuously driven front axle, permits the transmission of part of the torque to the rear axle, wherein the unit is located on the front axle differential or the rear axle differential, for example. Such different applications and arrangements are known from U.S. Pat. No. 7,111,716 B2, for example.

A clutch unit can also act in the transverse direction of the motor vehicle, for example for a differential lock of an axle differential or in a torque superposition arrangement of an axle differential (known as "torque vectoring"). In all of the aforementioned cases, the clutch unit can frictionally connect a rotating input element (e.g., input shaft) and a rotating output element (e.g., output shaft), particularly in order to transmit a drive torque. As an alternative thereto, the clutch unit can be configured as a brake with a stationary input element or a stationary output element, particularly in order to transmit a braking torque.

In the aforementioned applications of the clutch unit, the clutch unit is located after the main transmission of the drive train (e.g., after the manual or automatic transmission or CVT transmission) with respect to the direction of power flow. Normally, the clutch torque—which is to say the torque transmitted by the friction clutch—is variably adjusted as a function of the relevant driving situation. Thus, a change in the torque to be transmitted by the clutch unit takes place in accordance with the requirements of vehicle dynamics, which may depend on such factors as the driving situation or environmental influences (e.g., smooth road surface with slip of the drive wheels occurring). This requires not only controlled engagement of the friction clutch, but frequently also requires a relatively long period of operation with precisely adjusted clutch torque, for which reason the friction clutch usually is designed as a wet plate clutch in the aforementioned applications. Typically, the friction clutch is integrated into a housing, which contains oil for cooling and lubricating the frictional components. For example, an oil sump is provided at the bottom of the housing, whence an oil pump continuously pumps oil during the operation of the clutch and drips it on the friction surfaces. The oil returns to the oil sump from the friction surfaces.

The clutch unit further includes an actuator for actuating the friction clutch. The actuator often has an electric motor, and is attached to the housing of the clutch unit in a thermally conductive way in order to use the housing as a heat sink for the actuator's waste heat. Under certain operating conditions, overheating of the actuator can occur. Consequently, the actuator is typically equipped with a temperature sensor that continuously senses the temperature of the actuator. In this way, clutch operation can be discontinued in the event of impending overheating of the actuator. If the actuator has an electric motor, the temperature sensor can, for example, be attached to the housing of the electric motor or within the same.

A clutch unit of the aforementioned type and a method for calibrating such a clutch unit are known from WO 2003/025422 A1 (corresponding to U.S. Pat. No. 7,032,733 B2), the content of which is expressly incorporated in the disclosure content of the present application. As is described in greater detail in WO 2003/025422 A1, the setting of a specific desired clutch torque does not necessarily require the provision of direct torque control (with the measured actual clutch torque as the control variable). Instead, the control of the friction clutch can take place by indirect means through controlling the position of the actuator based on an appropriate calibration of the clutch unit. Thus, to set the desired torque to be transmitted, the angle of rotation of the electric motor, for example, or another position variable of the actuator, is employed as a control variable and is set to a value that corresponds to the desired clutch torque. To this end, a clutch torque/actuator position dependence is empirically determined, which is stored as a characteristic curve, for example in the form of a table (lookup table, LUT) or a function (which is to say an algorithm). Using this dependence, the applicable target value of the relevant position variable of the actuator (e.g., angle of rotation) is determined for a specific torque requirement and is regulated.

For a variety of control tasks relating to operation of the clutch unit, it is necessary to determine the current temperature of the oil located in the clutch housing. To this end, a suitable temperature sensor could be provided in the oil sump, for example. However, an arrangement of this nature is associated with increased effort and additional costs.

SUMMARY

This section provides a general summary of the disclosure, and is not a comprehensive disclosure of its full scope or all of its features.

It is an object of the present disclosure to provide a computational determination of the oil temperature in a clutch unit that can be implemented simply, economically, and reliably.

This object is attained by a method for computationally determining the oil temperature in a clutch unit with the following steps: determining a thermal input power to the clutch unit as a function of at least a speed of the input element and/or of the output element of the clutch unit; determining a thermal output power of the clutch unit as a function of at least the actuator temperature; determining a difference between the thermal input power and the thermal output power; and determining the oil temperature as a function of the difference that was determined.

In the calculation of the oil temperature, therefore, the heat input brought into the clutch unit and the heat output taken out of the clutch unit are taken into account and placed into relation to one another in order to determine a corresponding change in the oil temperature in the clutch unit, and thus to determine a current value of the oil temperature. In order to determine the thermal input power to the clutch unit, at least the speed of the input element of the clutch unit or the speed of the output element of the clutch unit—or a difference between these two speeds—is taken into account. These speeds are customarily available in any case, for example because of the wheel speed sensors of the motor vehicle that are usually present. In order to determine the thermal output power from the clutch unit, at least the temperature of the actuator of the clutch unit is taken into account, something which is normally measured in any case as well, as was explained above, and thus is available without additional effort. By offsetting the thermal input power with the thermal output power, it is possible to estimate whether the oil temperature within the clutch unit has increased or decreased. To this end, the oil temperature is ultimately equated with a function of the difference determined between the thermal input power and the thermal output power of the clutch unit. This computational determination of the oil temperature can be achieved in an especially simple and economical manner, since additional sensors are not strictly necessary.

Within the scope of the present disclosure, it has been recognized in particular that, because of the thermally conductive connection between the actuator and the clutch housing, the temperature of the actuator, which is measured in any case for monitoring purposes, permits certain inferences to be drawn about the surrounding temperature and thus can be used as a substitute quantity for that temperature. It has additionally been recognized that the thermal output power of the clutch unit can consequently be estimated on the basis of the actuator temperature using a heat flow model. By placing this thermal output power in relation to the thermal input power to the clutch unit, it is possible to determine the oil temperature by purely computational means. As a result, an additional temperature sensor in the oil sump can be avoided.

The steps of the method to be carried out need not necessarily be performed in the specified order. It is also not strictly necessary that they be performed one after the other chronologically, i.e., at least some of them may also be performed simultaneously with one another.

In a wet friction clutch, the aforementioned dependence between actuator position and transmitted torque is dependent on the consistency of the oil, in particular its viscosity. Since the viscosity of the oil is temperature-dependent, undesirable deviations between the required torque (target value) and the actually transmitted torque (actual value) can occur during clutch operation.

Consequently, it is an additional object of the present disclosure to reduce such deviations between target value and actual value of the clutch torque. This is achieved in a method for controlling a clutch unit by the means that the oil temperature in the clutch unit is computationally determined using the above-described method, and the clutch unit is controlled as a function of the oil temperature thus determined. In particular, the above-described characteristic curve of the friction clutch, which describes the dependence between the clutch torque and an actuator control variable, can be adapted as a function of the current oil temperature that has been determined. Temperature-induced deviations of the clutch characteristic from the behavior described by the characteristic curve can be compensated for in this way, thus increasing the accuracy of adjustment of the clutch unit. The actuator control variable can be, for instance, an actuator position (angular position, in particular) or a hydraulic pressure.

Preferably, in order to computationally determine the oil temperature, a time integral of the thermal input power during operation of the clutch unit and/or a time integral of the thermal output power during operation of the clutch unit and/or a time integral of the difference between the thermal input power and the thermal output power during operation of the clutch unit is calculated. Such calculation of an integral makes it possible to ascertain a heat quantity based on the applicable thermal power in order to determine the oil temperature therefrom.

An especially simple and precise determination of the oil temperature results when the product of the oil temperature (to be determined) and a thermal capacity of the clutch unit is set equal to the difference determined between the thermal input power and the thermal output power (or the difference between the heat input quantity and the heat output quantity). This corresponds to the thermodynamically supported assumption that the heat introduced into the clutch unit and not carried off to the outside leads to a corresponding increase in the oil temperature. The thermal capacity of the clutch unit to be used here can be empirically determined for the applicable type of clutch unit, wherein the thermal capacity can in turn depend on additional parameters.

According to one embodiment, the determination of the thermal input power to the clutch unit takes place as a function of a speed difference between the input element and the output element. By this means, a speed difference between, e.g., the inner plates and the outer plates of the friction clutch can be taken into account in order to determine the frictional heat generated in the clutch.

Preferably, the determination of the thermal input power also takes place as a function of a clutch torque. This clutch torque is, for example, a torque requirement (target value) or the calculated or measured torque actually transmitted (actual value). In particular, it is possible to find the product of the clutch torque, the speed of the input element or output element, and a constant that depends on an efficiency of a transmission component and/or an oil pump of the clutch unit. In place of the speed of the input element or output element, a speed difference between the input element and output element can also enter into the product. By this means, it is possible to determine a power dissipation of the clutch unit, which stands in relation to the thermal input power.

For an especially accurate determination of the thermal output power of the clutch unit, it can be assumed that this quantity itself depends in turn on the oil temperature (to be determined). In this case, the above-described equating of the oil temperature to a function of the difference determined between thermal input power and thermal output power results in a differential equation. As an alternative hereto, the simplifying assumption can be made for determining the thermal output power that the output power depends on the last calculated oil temperature.

Preferably, the determination of the thermal output power of the clutch also takes place as a function of a coefficient of thermal conductivity of the clutch unit. This takes into account the thermal conductivity properties resulting from the particular features of the housing material and the design features. The thermal conductivity coefficient can also be empirically determined for the specific type of clutch unit.

Preferably, the thermal conductivity coefficient is chosen as a function of the speed of the input element and/or output element. It has been demonstrated that the accuracy of the determination of the clutch unit's thermal output power can be improved still further by this means. The associated relationship between speed and thermal conductivity coefficient can be empirically determined and stored in the form of a lookup table, for example.

An initialization of the calculation process can be accomplished by the means that the oil temperature at a startup of the motor vehicle is set equal to an initial value that depends on the current actuator temperature. Hence, use is made of the recognition that the actuator temperature and oil temperature in a vehicle that is stopped gradually approach one another, since both components use the clutch housing as a heat sink. The initial value of the oil temperature may additionally depend on a value of the oil temperature that was last determined during a preceding operation of the motor vehicle. Furthermore, the initial value can additionally be determined as a function of a duration of a preceding stoppage of the motor vehicle. In this way, it is possible to take into account the fact that the clutch represents a heat reservoir for the oil, which is to say the oil cools more slowly in general than the actuator, for example.

The duration of the preceding stoppage of the motor vehicle is preferably determined as a function of the difference between the current actuator temperature and the last actuator temperature detected during a preceding operation of the motor vehicle. This duration thus determined, which is also called the inactive time, can also be used for other control tasks. Thus, a dedicated timer is not strictly necessary in order to determine the duration of the preceding inactive time of the motor vehicle. Alternatively, however, the inactive time can also be detected separately, for example by means of a timer.

According to a preferred embodiment, the actuator has an electric motor, with which the temperature sensor is associated. Electric motors must be protected in a specific manner from overheating, which is why the temperature sensor here serves to output an alarm signal when a threshold temperature that is considered hazardous is exceeded.

As already mentioned above, the method for computational determination of the oil temperature can be used to good advantage for controlling the clutch unit. Preferably, the characteristic curve of the friction clutch that describes the dependence of the clutch torque on the actuator control variable is adapted as a function of the oil temperature that has been determined. By adapting the characteristic curve, temperature-dependent influencing factors in the wet friction clutch can be taken into account in a simple way. It is useful if the characteristic curve is adapted by modifying a slope and/or an offset. In particular, the adaptation of the characteristic curve can be performed on a periodic or continuous basis during operation of the clutch.

The present disclosure also relates to a torque transmission arrangement that has an input element, an output element, a clutch unit, and a control unit, wherein the clutch unit has, at a minimum, a wet friction clutch for controllable transmission of a torque from the input element to the output element, a housing that contains the friction clutch and oil for cooling the friction clutch, and an actuator for actuating the friction clutch that is attached to the housing in a thermally conductive way and has a temperature sensor for sensing a temperature of the actuator, wherein the control unit is designed to determine a thermal input power to the clutch unit as a function of at least a speed of the input element and/or of the output element of the clutch unit, to determine a thermal output power of the clutch unit as a function of at least the actuator temperature, to determine a difference between the thermal input power and the thermal output power, and to determine an oil temperature as a function of the difference that was determined.

The clutch unit or torque transmission arrangement can be used in different configurations in order to transmit a torque along a drive train of a motor vehicle, as was explained at the outset. The features of the present disclosure are explained below with reference to the drawings, in connection with a "torque on demand" transfer case solely by way of example.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
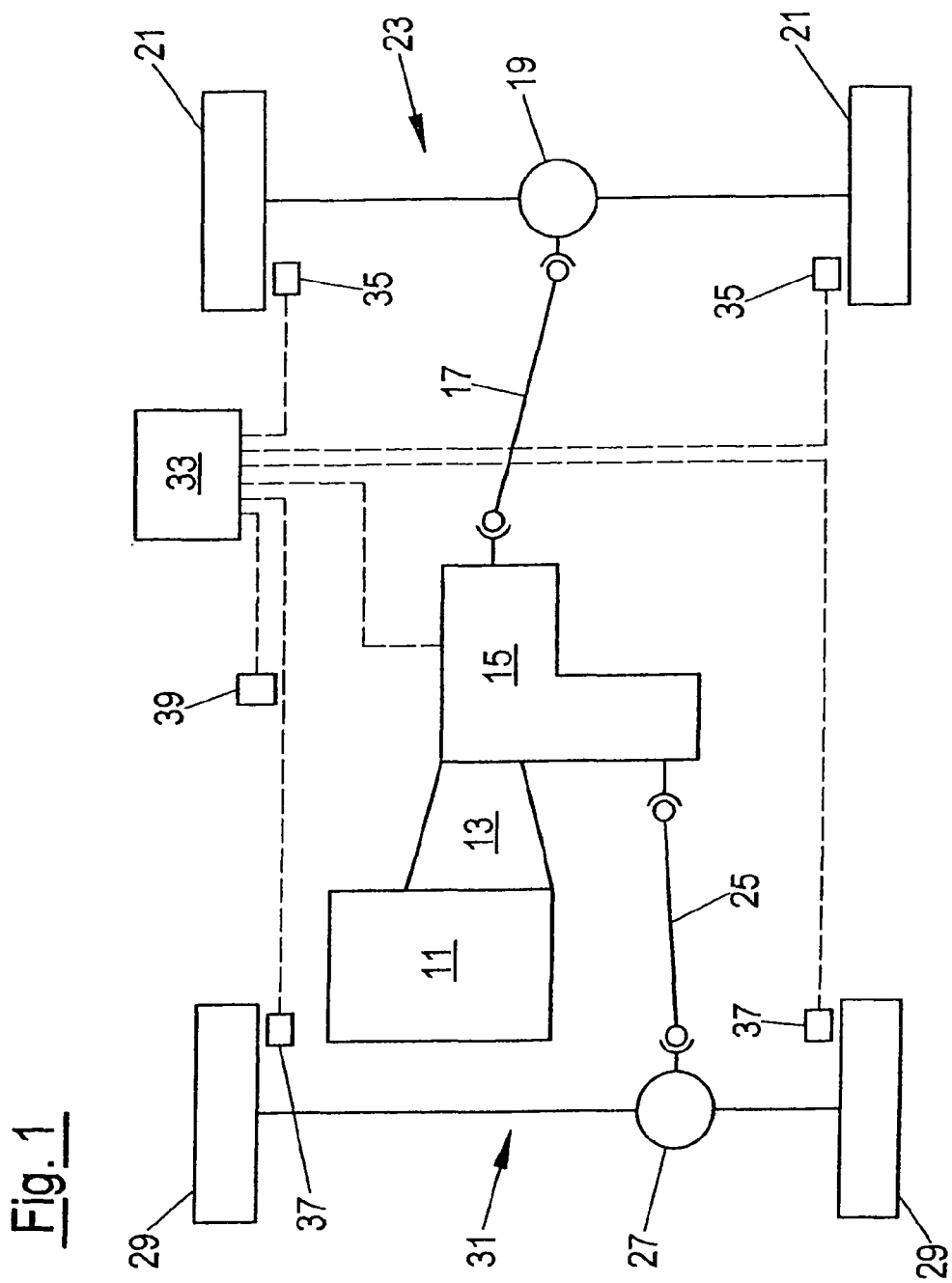
FIG. 1 shows a schematic view of a drive train of a motor vehicle.

FIG. 1 schematically shows a drive train of a motor vehicle with selectable four-wheel drive. The drive torque produced by an internal combustion engine 11 is delivered to a transfer case 15 through a main transmission 13 (manual transmission or automatic transmission). A first output of the transfer case 15 is coupled to a rear axle differential 19 through a drive shaft 17. In this way, the wheels 21 of the rear axle 23 are driven continuously. The rear axle 23 thus constitutes the primary axle of the motor vehicle. A second output of the transfer case 15 is coupled to a front axle differential 27 through a drive shaft 25. In this way, a portion of the drive torque of the internal combustion engine 11 can be selectively transmitted to the wheels 29 of the front axle 31. The front axle 31 thus constitutes the secondary axle of the motor vehicle.

Also shown in FIG. 1 is a vehicle dynamics controller 33. This is connected to wheel speed sensors 35, 37, which are associated with the wheels 21 of the rear axle 23 and the wheels 29 of the front axle 31. The vehicle dynamics controller 33 is also connected to additional sensors 39, for example a yaw-rate sensor. As a function of the signals from the sensors 35, 37, 39, the vehicle dynamics controller 33 generates a control signal, which is delivered to a control unit (not shown in FIG. 1) of the transfer case 15, in order to set a specific distribution of the drive torque between the two axles 23, 31 of the vehicle by this means. The aforementioned control signal is, in particular, a target value of a clutch torque, which is to say a torque requirement for a clutch unit of the transfer case 15.

Figure 2:
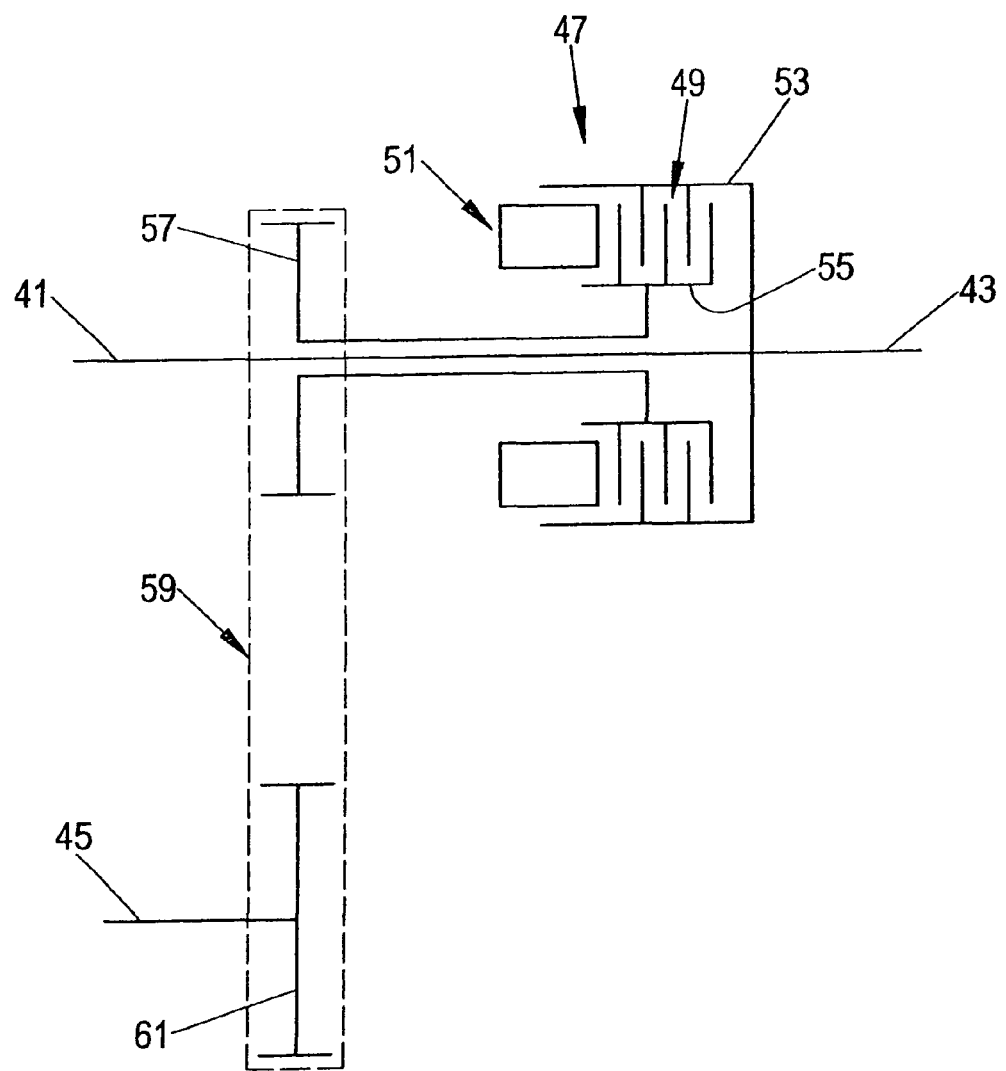
FIG. 2 shows a schematic view of a transfer case.

FIG. 2 shows a schematic cross-sectional view of the transfer case 15 from FIG. 1. The transfer case 15 has an input shaft 41, a first output shaft 43, and a second output shaft 45. The first output shaft 43 is coaxial to the input shaft 41 and is designed to be rotationally fixed therewith, preferably as a single piece. The second output shaft 45 is parallel to and offset from the input shaft 41.

The transfer case 15 has a clutch unit 47 with a friction clutch 49 and an actuator 51. The friction clutch 49 has a clutch basket 53 that is attached in a rotationally fixed manner to the input shaft 41 and the first output shaft 43 and that carries multiple clutch plates. The friction clutch 49 also has a rotatably supported clutch hub 55, which likewise carries multiple clutch plates that engage in an alternating arrangement with the plates of the clutch basket 53. The clutch hub 55 is connected in a rotationally fixed manner to an input gear 57 of a chain drive 59. An output gear 61 of the chain drive 59 is connected in a rotationally fixed manner to the second output shaft 45. A gear drive, for example with an intermediate gear between the aforementioned gears 57, 61, may be provided in place of the chain drive 59.

By actuating the actuator 51 in the engagement direction of the friction clutch 49, an increasing fraction of the drive torque introduced into the transfer case 15 through the input shaft 41 can be transmitted to the second output shaft 45.

Figure 3:
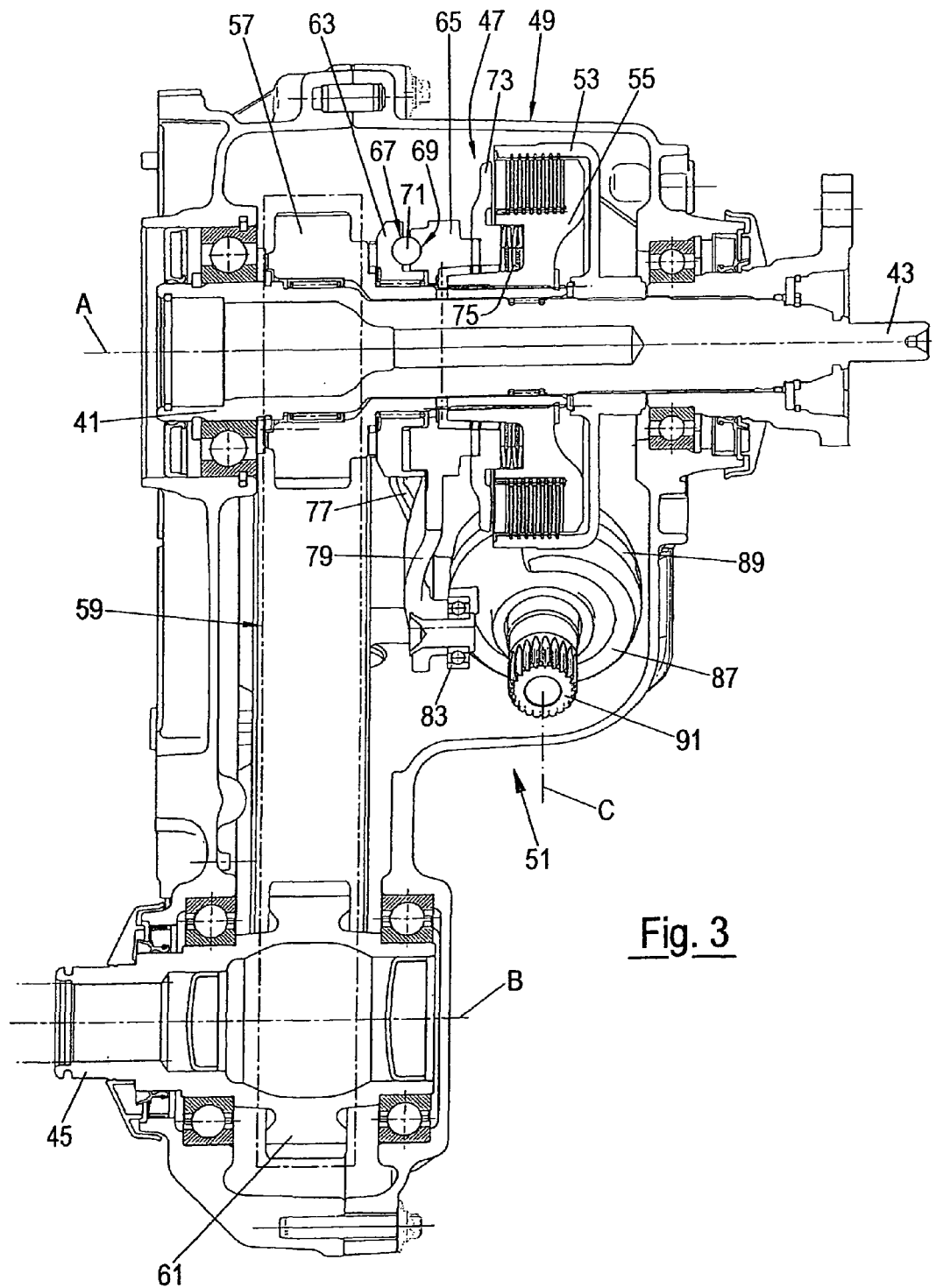
FIG. 3 shows a cross-sectional view of the transfer case from FIG. 2.

FIG. 3 shows details of the transfer case 15 from FIG. 2 in a cross-sectional view. In particular, it is evident that the actuator 51 has a bearing ring 63 and an adjusting ring 65, which are rotatably supported with respect to the axis of rotation A of the input shaft 41 and the first output shaft 43. The bearing ring 63 is axially supported on the input gear 57 by means of a thrust bearing. In contrast, the adjusting ring 65 is supported in an axially displaceable manner. The bearing ring 63 and adjusting ring 65 each have multiple ball races 67 and 69 on their sides facing one another. These ball races extend in the circumferential direction with respect to the axis A and are inclined in a ramp-like manner in the circumferential direction with respect to a plane perpendicular to the axis A, which is to say that the ball races 67, 69 have a depth that varies in the circumferential direction. In each case, a ball race 67 of the bearing ring 63 and a ball race 69 of the adjusting ring 65 are located opposite one another and enclose an associated ball 71. By rotating the bearing ring 63 and the adjusting ring 65 relative to one another, an axial displacement of the adjusting ring 65 can thus be accomplished, wherein the adjusting ring 65 works together with a pressure ring 73 of the friction clutch 49 through a thrust bearing. The pressure ring 73 is preloaded in the disengagement direction of the friction clutch 49 by means of a spring washer arrangement 75.

An actuating lever 77 or 79 is integrally formed on the bearing ring 63 and the adjusting ring 65, respectively. A roller 81 or 83 is rotatably supported at the free end of each relevant lever 77, 79. By means of the rollers 81, 83, the actuating levers 77, 79 work together with the two end faces 85, 87 of a disk cam 89, which is rotatable relative to an axis C. The end faces 85, 87 are inclined in the circumferential direction relative to a plane perpendicular to the axis C, i.e., the disk cam 89 is wedge-shaped in cross-section. By rotating the disk cam 89, the actuating levers 77, 79 can thus be moved in a scissoring manner in order to rotate the bearing ring 63 and the adjusting ring 65 relative to one another. The disk cam 89 has an integrally formed splined projection 91. By means of the projection, the disk cam 89 can be connected to an electric motor and associated reduction gear (not shown in FIG. 3) in a manner that is effective for driving.

In this way, by appropriate control of the aforementioned electric motor the disk cam 89 can be driven into a rotary motion so as to thereby pivot the actuating levers 77, 79 relative to one another. The rotation of the bearing ring 63 and the adjusting ring 65 relative to one another that is produced thereby causes an axial motion of the adjusting ring 65. The pressure ring 73 thus causes an engagement of the friction clutch 49, or—assisted by the spring washer arrangement 75—a disengagement of the friction clutch 49.

Figure 4:
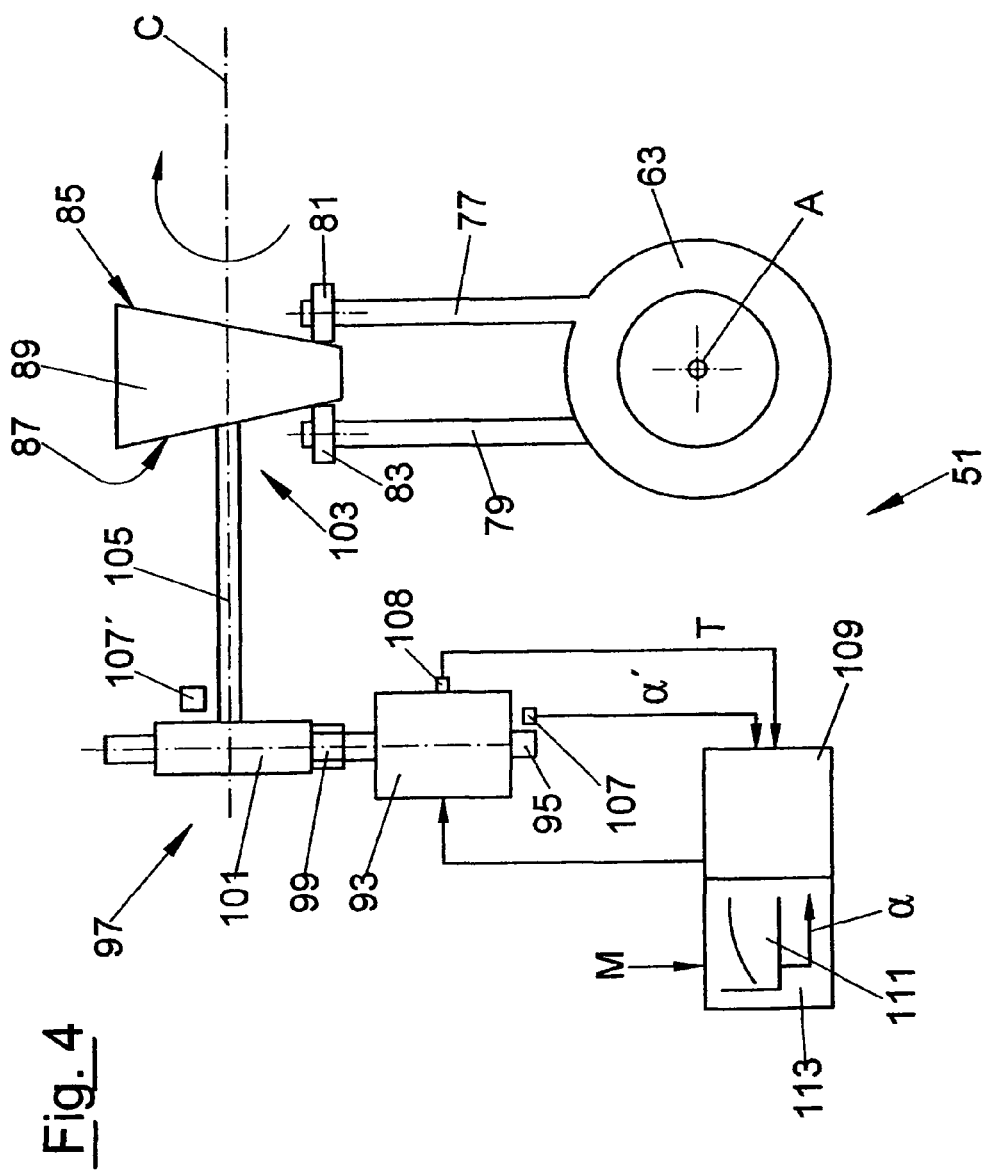
FIG. 4 shows a schematic view of a clutch actuator.

FIG. 4 shows the actuator 51 from FIG. 2 and FIG. 3 in a schematic view. The actuator 51 has a controllable electric motor 93 with an armature shaft 95, a reduction gearbox 97 with a worm 99 and worm wheel 101, and a deflection device 103. By means of the deflection device 103, a rotational motion of an output shaft 105 of the reduction gearbox 97 is converted into a translational, i.e., straight-line, motion of the pressure ring 73 (FIG. 3). The deflection device 103 comprises the disk cam 89 as well as the bearing ring 63 and the adjusting ring 65 with the actuating levers 77, 79 and the balls 71 as shown in FIG. 3. A sensor 107, which is designed as an incremental encoder for example, is located on the armature shaft 95 of the electric motor 93. Alternatively, as shown in FIG. 4, the sensor 107 may also be located on the output shaft 105 as a sensor 107'. In addition, a temperature sensor 108 that outputs a temperature signal T is attached to the electric motor 93.

The sensor 107 produces a signal that corresponds to an actuator position value. In the exemplary embodiment shown, this is the actual angular position value $\alpha'$ of the armature shaft 95. This signal $\alpha'$ is delivered to a control unit 109 of the transfer case 15. The control unit 109 also receives a torque requirement M, which is to say a target value of the clutch torque, from the vehicle dynamics controller 33 of the motor vehicle (FIG. 1). From a clutch torque/angular position characteristic curve 111, which is stored in a nonvolatile memory 113 of the control unit 109, the control unit 109 determines a target angular position value $\alpha$ on the basis of the torque requirement M. As a function of the difference between the target angular position value $\alpha$ and the actual angular position value $\alpha'$, the control unit 109 generates a control signal for the electric motor 93 in order to adjust the friction clutch 49 (FIGS. 2 and 3) accordingly. The control unit 109 thus acts as a position controller.

Figure 5:
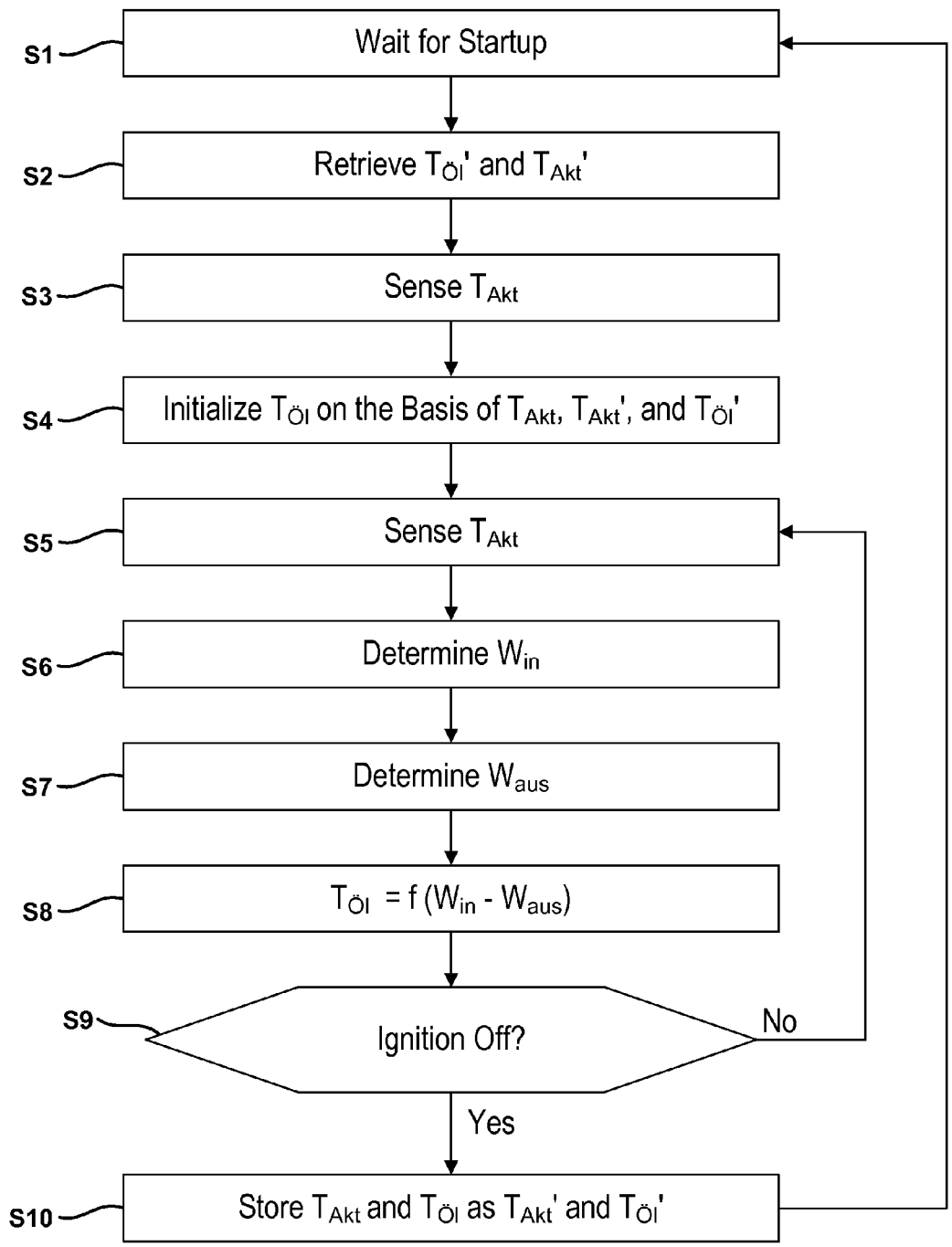
FIG. 5 shows a flow diagram of a method according to the present disclosure for computationally determining the oil temperature in a clutch unit.

The way the oil temperature in the clutch unit 47 can be ascertained and taken into account by means of the control unit 109 shown in FIG. 4 will now be explained with reference to FIG. 5.

A step S1 consists of waiting until the motor vehicle is started up. As soon as the vehicle has been started (the control unit 109 from FIG. 4 receives the "ignition on" signal), in a step S2 the last oil temperature $T_{Öl}'$ that was determined and the last actuator temperature $T_{Akt}'$ that was sensed are retrieved from a memory associated with the control unit 109. $T_{Öl}'$ and $T_{Akt}'$ can be loaded with suitable initial values by the factory in order to ensure that the method can be carried out the very first time the vehicle is started up. Then, in a step S3, the current temperature $T_{Akt}$ of the actuator 51 is sensed by the temperature sensor 108. An initialization of the oil temperature $T_{Öl}$ on the basis of $T_{Akt}$, $T_{Akt}'$, and $T_{Öl}'$ takes place in a step S4. In addition, the inactive time of the motor vehicle can be taken into account for the initialization. After the initialization, the current actuator temperature $T_{Akt}$ is measured again in a step S5.

In a step S6, the thermal input power $W_{in}$ to the clutch unit 47 is determined. In the embodiment described here, the power dissipation of the chain drive 59 (or of a corresponding associated gear drive) associated with the clutch unit 47 and the power dissipation of an oil pump (not shown) associated with the clutch unit 47 are taken into account for the thermal input power $W_{in}$. Alternatively or in addition, a power dissipation of the clutch plates can be taken into account. The aforementioned power dissipation of the chain drive 59 is calculated on the basis of a product of the required clutch torque M (FIG. 4), the speed of the second output shaft 45, and an empirically determined constant that is associated with the efficiency of the chain drive 59. The speed of the second output shaft 45 can be determined in a simple manner from the signals of the wheel speed sensors 37 of the front wheels 29 (FIG. 1), which usually are available in any case through the data bus of the vehicle. The power dissipation of the oil pump is determined as a function of the speed of the input shaft 41 or the first output shaft 43, wherein this speed is multiplied by, e.g., a constant that again is empirically determined. The speed of the input shaft 41 or first output shaft 43 can be determined in a simple manner from the signals of the wheel speed sensors 35 of the rear wheels 21.

In a step S7, the thermal output power $W_{aus}$ of W f the clutch unit 47 is determined as a function of the current actuator temperature $T_{Akt}$. In a preferred method, the thermal output power $W_{aus}$ is approximated in that the difference between the oil temperature $T_{Öl}$ to be determined in the current calculation cycle and the current actuator temperature $T_{Akt}$ is multiplied by a coefficient of thermal conductivity. Again, an empirically determined constant can be used for this thermal conductivity coefficient. However, it has been determined that the thermal output power $W_{aus}$ can be approximated with an especially high accuracy if the thermal conductivity coefficient of the clutch unit depends on the speed of the input shaft 41 or the second output shaft 45. This dependence is taken into account in the described method in that the thermal conductivity coefficient is retrieved, as a function of the speed that has been determined, from a lookup table stored in a memory associated with the control unit 109. Intermediate values can be found by interpolation if necessary.

In a step S8, the difference is obtained between the thermal input power $W_{in}$ that has been determined and the thermal output power $W_{aus}$ that has been determined, and the oil temperature $T_{Öl}$ to be determined is set equal to a function of this difference. In particular, a time integral of the difference is calculated, and is set equal to a product of the oil temperature $T_{Öl}$ to be determined and a thermal capacity of the clutch unit 47. The thermal capacity, in turn, can be inserted as an empirically determined constant. The time integral is calculated beginning with the startup of the vehicle, with the values that were determined in the initialization step S4 being used as initial values. Insofar as it is assumed that the thermal output power $W_{aus}$ itself depends—as explained above—on the oil temperature $T_{Öl}$ to be determined, setting the oil temperature $T_{Öl}$ equal to a function of the difference between the thermal input power $W_{in}$ and the thermal output power $W_{aus}$ ultimately yields a differential equation. The oil temperature $T_{Öl}$ can be determined from this equation, for example analytically, iteratively, or using a lookup table. When determining the thermal output power $W_{aus}$, a value of the oil temperature $T_{Öl}$ that was determined in a preceding computational step can be used as an alternative to taking into consideration the oil temperature $T_{Öl}$ that is to be determined. This simplifies the determination of the current oil temperature $T_{Öl}$.

The integral calculation need not take place using the difference, but instead it is possible to separately integrate the thermal input power $W_{in}$ and the thermal output power $W_{aus}$.

A step S9 checks whether the motor vehicle has been switched off. If the control unit 109 receives a corresponding signal ("ignition off"), the initialization values $T_{Öl}'$ and $T_{Akt}'$ are overwritten with the current values $T_{Öl}$ and $T_{Akt}$ and a return to step S1 takes place. If no "ignition off" signal is received in step S9, a return to step S5 takes place and the determination of the oil temperature $T_{Öl}$ continues according to the steps S5 through S8.

The oil temperature $T_{Öl}$ that is determined can be used, in particular, to adapt the clutch characteristic curve 111 (FIG. 4), for example by correcting the slope and/or the offset. In this way, it is possible, for example, to take into account the fact that the viscosity of the lubricating oil decreases with increasing operating temperature of the clutch unit 47, thus changing the clutch characteristics. As a result of the compensation of the temperature influences, the accuracy of the clutch torque control can be increased. The oil temperature $T_{Öl}$ that has been determined can also be used for additional control tasks as part of vehicle operation, however. To this end, it can be output to a CAN bus, for example, in order to thus be available to other control units.

While the present disclosure finds especially advantageous application in a transfer case with electromechanical actuation of the friction clutch, the present disclosure should not be limited to the above-described exemplary embodiment. Other arrangements in the drive train of a motor vehicle are also possible, as explained at the outset. Furthermore, the actuator 51 can be designed in a different manner than that described above in conjunction with the figures. For example, a different type of reduction gearbox 97 or a different type of deflection device 103 may be provided. In place of the electromechanical actuation of the friction clutch 49 shown, an electromagnetic, hydraulic, or electrohydraulic actuation may also be provided, for instance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for computational determination of the oil temperature in a clutch unit for a drive train of a motor vehicle, the clutch unit having a housing, a wet friction clutch disposed in the housing for controllable transmission of a torque from an input element to an output element of the clutch unit, oil for cooling the friction clutch disposed within the housing, and an actuator for actuating the friction clutch that is attached to the housing in a thermally conductive manner and has a temperature sensor for sensing a temperature of the actuator, the method comprising:

determining a thermal input power to the clutch unit as a function of at least a speed of one of the input element and the output element of the clutch unit;
determining a thermal output power of the clutch unit as a function of at least the actuator temperature;
determining a difference between the thermal input power and the thermal output power; and
determining the oil temperature as a function of the difference between the thermal input power and the thermal output power.

2. The method according to claim 1, further comprising calculating at least one of a time integral of the thermal input power during operation of the clutch unit, a time integral of the thermal output power during operation of the clutch unit, and a time integral of the difference between the thermal input power and the thermal output power during operation of the clutch unit.

3. The method according to claim 1, wherein a product of the oil temperature and a thermal capacity of the clutch unit is set equal to the difference determined between the thermal input power and the thermal output power.

4. The method according to claim 1, wherein the determination of the thermal input power to the clutch unit takes place as a function of a speed difference between the input element and the output element.

5. The method according to claim 1, wherein the determination of the thermal input power to the clutch unit takes place as a function of a clutch torque.

6. The method according to claim 5, wherein the clutch torque is multiplied by one of the speed of the input element, the speed of the output element, and a speed difference between the input element and the output element.

7. The method according to claim 1, wherein the determination of the thermal input power to the clutch unit additionally takes place as a function of an efficiency of at least one of a transmission component and an oil pump of the clutch unit.

8. The method according to claim 1, wherein the determination of the thermal output power of the clutch unit additionally takes place as a function of the oil temperature to be determined or of a last oil temperature determined.

9. The method according to claim 1, wherein the determination of the thermal output power of the clutch unit additionally takes place as a function of a coefficient of thermal conductivity of the clutch unit.

10. The method according to claim 9, wherein the thermal conductivity coefficient is chosen as at least one of a function of the speed of the input element and the output element.

11. The method according to claim 1, wherein the oil temperature at a startup of the motor vehicle is set equal to an initial value that depends on the current actuator temperature.

12. The method according to claim 11, wherein the initial value of the oil temperature additionally depends on an oil temperature that was last determined during a preceding operation of the motor vehicle.

13. The method according to claim 11, wherein the initial value of the oil temperature is additionally determined as a function of a duration of a preceding stoppage of the motor vehicle.

14. The method according to claim 13, wherein the duration of the preceding stoppage of the motor vehicle is determined as a function of the difference between the current actuator temperature and the last actuator temperature detected during a preceding operation of the motor vehicle.

15. The method according to claim 1, wherein the actuator has an electric motor, with which the temperature sensor is associated.

16. A method for controlling a clutch unit for a drive train of a motor vehicle, wherein an oil temperature in the clutch unit is computationally determined using the method according to claim 1, and wherein the clutch unit is controlled as a function of the oil temperature thus determined.

17. The method according to claim 16, wherein a characteristic curve of the friction clutch that describes a dependence of a clutch torque on an actuator control variable is adapted as a function of the oil temperature that has been determined.

18. The method according to claim 17, wherein the characteristic curve is adapted by modifying at least one of a slope and an offset of the characteristic curve.

19. A torque transmission arrangement comprising:
an input element;
an output element;
a clutch unit having a housing, a wet friction clutch disposed in the housing for controllable transmission of a torque from the input element to the output element, oil for cooling the friction clutch, and an actuator for actuating the friction clutch that is attached to the housing in a thermally conductive manner and has a temperature sensor for sensing a temperature of the actuator; and
a control unit, the control unit being operable to:
determine a thermal input power to the clutch unit as a function of at least one of a speed of the input element and a speed of the output element of the clutch unit;
determine a thermal output power of the clutch unit as a function of at least the actuator temperature;
determine a difference between the thermal input power and the thermal output power; and
determine an oil temperature as a function of the difference between the thermal input power and the thermal output power.

* * * * *